United States Patent [19]

Cumbie

[11] Patent Number: 5,004,390

[45] Date of Patent: Apr. 2, 1991

[54] LOCK FOR RETAINER PIN

[76] Inventor: Carlyen F. Cumbie, 1169 Cole Dr., Lilburn, Ga. 30247

[21] Appl. No.: 462,052

[22] Filed: Jan. 8, 1990

[51] Int. Cl.⁵ .............................................. F16B 21/02
[52] U.S. Cl. ..................................... 411/340; 411/351
[58] Field of Search ................ 24/598, 573, 453, 574; 411/513, 514, 578, 351, 356, 364, 340, 910; 403/154, 155

[56] References Cited

U.S. PATENT DOCUMENTS

| | | | |
|---|---|---|---|
| 3,926,089 | 12/1975 | Ruebig et al. | 411/340 |
| 4,102,124 | 7/1978 | Swager | 403/154 X |
| 4,553,891 | 11/1985 | Aubrun | 411/351 |
| 4,589,693 | 5/1986 | Kennedy | 411/910 X |
| 4,840,528 | 6/1989 | Doom | 411/351 |

Primary Examiner—James R. Brittain
Attorney, Agent, or Firm—James B. Middleton

[57] ABSTRACT

A lock for a retainer pin prevents accidental opening of the ring of the retainer pin. A body has an elongated slot receiving the ring of a retainer pin, with a detent to inhibit motion of the body on the ring. A bore in the body is alignable with the pin of the retainer pin. The bore has an open portion that allows free movement away from the pin, and a closed portion that prevents movement away from the pin. The retainer pin may have a colored portion that is outside the bore when the pin is received only in the open portion of the bore, and is inside the bore when the pin is received in the closed portion of the bore.

7 Claims, 1 Drawing Sheet

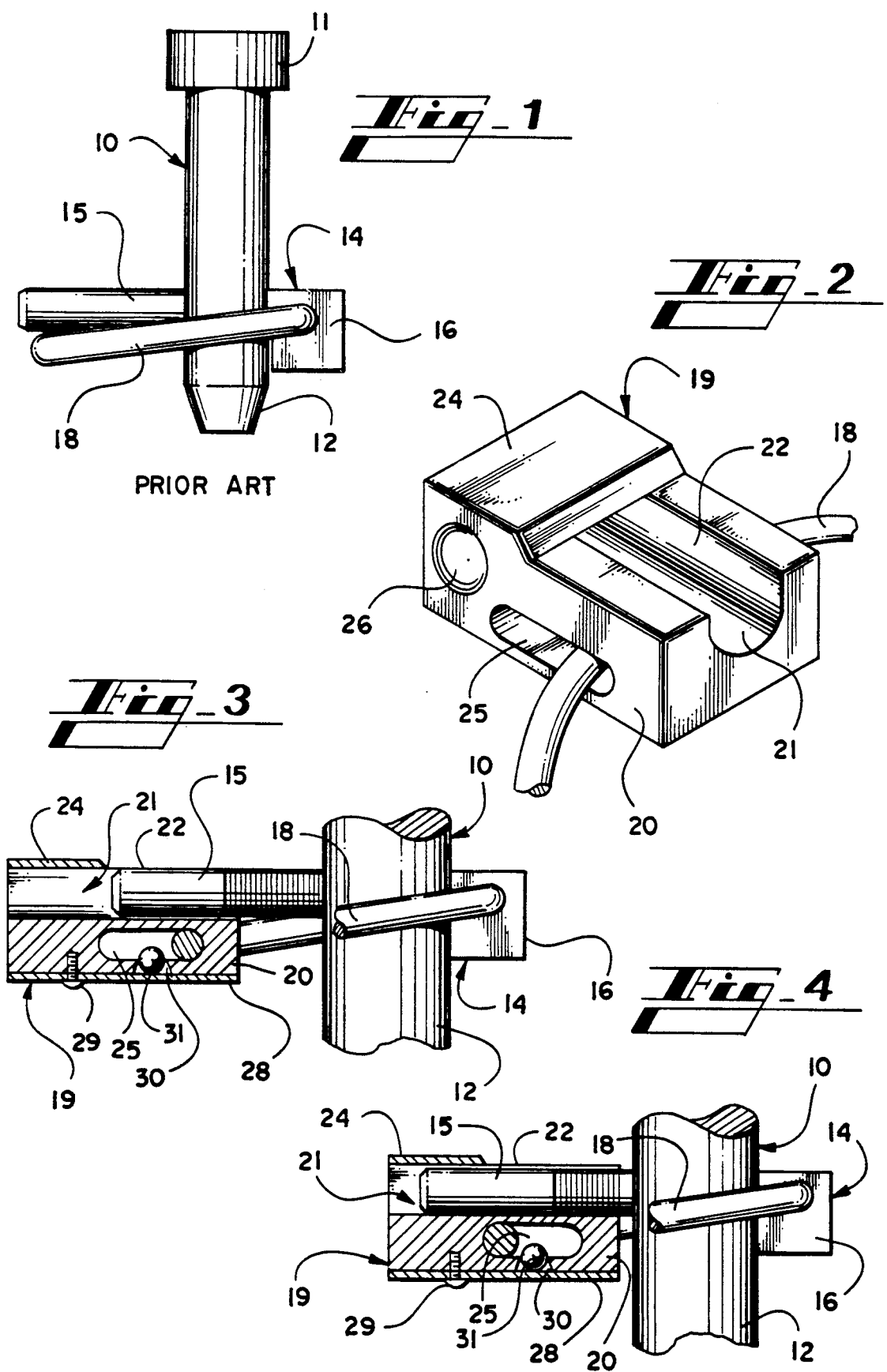

LOCK FOR RETAINER PIN

INFORMATION DISCLOSURE STATEMENT

It is very common to utilize a clevis arrangement for temporary attachment of an implement or the like to be towed by a vehicle. In the conventional arrangement, a clevis is carried by the towing vehicle, the tongue of the implement is received in the clevis, and a clevis pin, or hitch pin, passes through the clevis and through the tongue to attach the implement to the towing vehicle. To retain the clevis pin in position, one has in the past utilized a cotter pin, a nut threaded onto the clevis pin, or other similar arrangement. While these arrangements are reasonably effective, they are rather time consuming both to install and to remove. Additionally, more recently, clevis pins, or hitch pins, are held in place by means of a retainer pin. The retainer pin is received through a hole in the lower end of the clevis pin; and, a ring having a toggle action is fixed to the head end of the retainer pin, the toggle action effectively holding the ring against the opposite end of the retainer pin. The result is that the lower end of the clevis pin passes through the ring of the retainer pin, and the retainer pin cannot be removed.

While retainer pins of the type described above are quick and easy to use, and generally are quite secure, in some circumstances the ring can be pulled open, thereby allowing the retainer pin to slip from the clevis pin. Some retainer pins have stronger spring forces than others, and this stronger spring force assists in preventing inadvertent removal of the retainer pin, but the prior art does not include means to assure that the retainer pin remains in place.

SUMMARY OF THE INVENTION

This invention relates generally to clevis pins and the like, and is more particularly concerned with locking means for a clevis retainer pin.

The present invention provides a locking means to be used in conjunction with a retainer pin having a ring for normally holding the retainer pin in place on a clevis pin. The conventional retainer pin includes a pin having a head, and a ring pivotally carried by the head and arranged as a toggle to be either pivoted against the pin itself, or pivoted well away from the pin to allow the pin to be inserted. The lock of the present invention receives the portion of the ring that normally lies against the retainer pin, and includes a locking cavity for selectively receiving the end of the retainer pin. When the retainer pin is within the locking cavity of the locking means of the present invention, the ring is prevented from pivoting away from the retainer pin. When it is desired to release the retainer pin, the locking means is moved outwardly with respect to the ring, releasing the retainer pin from the locking cavity to allow normal operation of the retainer pin.

BRIEF DESCRIPTION OF THE DRAWINGS

These and other features and advantages of the present invention will become apparent from consideration of the following specification when taken in conjunction with the accompanying drawings in which:

FIG. 1 is a side elevational view of a conventional clevis pin having a prior art retainer pin mounted thereon in locking position;

FIG. 2 is a perspective view showing the locking means of the present invention and a portion of the ring of the retainer pin;

FIG. 3 is a longitudinal cross-sectional view through the locking mean shown in FIG. 2, and showing a retainer pin in conjunction therewith, the locking means being in the unlocked condition; and, FIG. 4 is a view similar to FIG. 3 but showing the locking means in locked position.

DETAILED DESCRIPTION OF THE EMBODIMENT

Attention is now directed more particularly to the drawings and to that embodiment of the invention here presented by way of illustration.

Looking first at FIG. 1 of the drawings, an understanding of the prior art retainer pin is necessary for a full understanding of the locking means of the present invention. FIG. 1 shows a conventional clevis pin, or hitch pin, 10 having a head 11 and a lower end 12. Slightly above the lower end 12, the pin 10 defines an opening therethrough for receiving the retainer pin generally designated at 14 and including a pin 15 having a head 16 at one end thereof. The head 16 mounts a ring 18 and is provided with a toggle arrangement to urge the ring 18 either against the pin 15 as shown in FIG. 1, or pivoted through an angle of around 125°.

With the above description in mind, it will be understood that the clevis pin 10 will typically be received through the flanges of a clevis and the tongue of an implement or the like will be between the flanges of the clevis. The clevis pin 10 will therefore secure the implement to the towing vehicle. Below the clevis, the retainer pin 15 will be passed through the opening in the clevis pin 10. After the retainer pin 14 is in position with the head 16 substantially adjacent to the clevis pin 10, the ring 18 will be pivoted to surround the hitch pin 10 and lie against the pin 15. It will be readily seen that, in this position, the retainer pin 15 cannot be removed from the clevis pin 10.

While the above described retainer pin is simple and usually effective, it has been found that, in certain conditions, the ring 18 inadvertently moves to its open position so the retainer pin 14 can easily fall from the hitch pin 10. By way of example, when the hitch pin is utilized to hitch a mower to a tractor, and one is mowing heavy brush, the brush can pull the ring 18 to its open position. Similarly, if one is mowing corn stalks, a corn stalk can pass through the ring 18 and inadvertently move the ring 18 to its open position.

The locking means of the present invention is shown in FIG. 2, and the locking means is mounted on the ring 18 of the retainer pin 14. The ring 18 is shown only fragmentarily in FIG. 2.

The locking means shown in FIG. 2 is generally designated at 19 and includes a body 20 having a longitudinal bore 21 therethrough. Since the forward portion 22 of the bore 21 is open, it is effectively a slot in the body 20. The rear portion of the bore 21 is closed by a portion of the body 20 which shall be referred to as a locking plate designated at 24.

The body 20, at one side of the bore 21, defines a slot 25 therethrough for receiving the ring 18. It will be noticed that the slot 25 is somewhat elongated to allow reciprocal motion of the ring 18 with respect to the body 20. This will be discussed in more detail hereinafter.

As here illustrated, there are depressions 26 which may be used as grips for reciprocating the locking means.

Attention is now directed to FIGS. 3 and 4 of the drawings. The two figures are alike except that FIG. 3 shows the locking means in unlocked position and FIG. 4 shows the locking means in locked position. The same reference numerals appear throughout, including the reference numerals used in FIG. 1 of the drawings. The clevis pin 10 and retainer pin 14 are the same.

FIGS. 3 and 4 show a longitudinal cross-sectional view of the locking means 19, and it will be seen that the lower surface of the body 20 carries a leaf spring 28, the spring 28 being held in place by a screw 29. An opening 30 in the body 20 receives a ball detent 31, movement of the ball 31 being limited by the opening 31, while the ball is held in its innermost position by the spring 28. It will therefore be seen that the ball 31 extends into the slot 25. It will also be seen in FIGS. 3 and 4 of the drawings that the ring 18 substantially fills the slot 25 so the ring 18 cannot move past the ball 31 while the ball is in the position shown.

Looking at FIGS. 3 and 4 of the drawings, it will be apparent that the locking means 19 can be slid back and forth, axially of the retainer pin 15. Since the ring 18 is fixed with respect to the retainer pin 14, the ring 18 must move in the slot 25 to allow the pin 15 to move in the bore 21. By using the ball 31 as a detent, it will be seen that, with sufficient force exerted, the ring 18 will force the ball 31 out of the slot 25, against the tension of the spring 28, so the ring 18 can pass the ball 31. It will of course be understood that the spring 28 is sufficiently strong that the locking means 19 is not easily shifted from locked to unlocked position, or vice versa.

With the above description in mind, operation of the device should be easily understood. The retainer pin 14 will be used in conventional fashion, the ring 18 being moved to its open position to allow the pin 15 to be passed through the opening in the clevis pin 10. After the retainer pin is in place, the ring 18 will be moved towards the pin 15 with the locking means 19 carried by the ring 18, the pin 15 will be received in the open portion 22 of the bore 21. This is the position shown in FIG. 3 of the drawings. At this point, the locking means can be urged towards the clevis pin 10 and sufficient force must be exerted to cause the ring 18 to ride over the spring-urged ball detent 31 to move the parts to the position shown in FIG. 4 of the drawings. Here it will be seen that the pin 15 is within the bore 21, under the locking plate 24. As a result, the ring 18 cannot now pivot away from the pin 15.

The present invention includes an additional safety feature which is simply a color coded alarm. Looking at FIG. 3 of the drawings, it will be seen that a portion of the pin 15 has vertical lining to indicate the color red. When the locking means 19 is in its open position as shown in FIG. 3, the red coloring is visible between the locking means 19 and the clevis pin 10. However, when the locking means is moved to the latching position as shown in FIG. 4, it will be seen that the red portion is contained within the bore 21 so the red is no longer visible. It will therefore be readily understood that one can quickly check the hitches, and if red is showing on a retainer pin, one of the locking means has opened. If no red is showing, all is well.

The present invention therefore provides a secure locking means for a retainer pin. The locking means is in addition to the normal toggle arrangement of the retainer pin; and, when the locking means is in its locked position, it is impossible for the ring of the retainer pin to move to its open condition. The visual alarm makes the device more secure by giving advance notice of a potential problem with the retainer pin.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

I claim:

1. In a retainer pin including a pin, a head at one end of said pin, and a ring pivotally mounted on said head, said ring being pivotal between a closed position in which a portion of said ring lies against said pin and an open position in which said ring is moved away from said pin, the combination therewith of locking means for said ring, said locking means comprising means for securing said portion of said ring with respect to said pin for preventing motion of said ring away from said pin, said locking means further including a body, said body defining a slot receiving said ring therethrough, said ring being slidable within said slot for allowing said body to be selectively moved to a locking position and to an unlocking position, said locking means further including a detent extending into said slot for inhibiting sliding motion of said ring in said slot, thereby inhibiting motion of said body between said locking position and said unlocking position.

2. In the combination as claimed in claim 1, said detent including a ball received in an opening in said body, and a spring urging said ball into said slot.

3. In a retainer pin including a pin, a head at one end of said pin, and a ring pivotally mounted on said head, said ring being pivotal between a closed position in which a portion of said ring lies against said pin and an open position in which said ring is moved away from said pin, the combination therewith of locking means for said ring, said locking means comprising means for securing said portion of said ring with respect to said pin for preventing motion of said ring away from said pin, the improvement wherein said locking means includes a body carried by said ring, a bore defined in said body for receiving said pin, a latch plate closing a portion of said bore, said bore including an open portion for allowing pivotal motion of said body away from said pin, said body being selectively movable to a locked position in which said pin is received within said portion of said bore closed by said latch plate, and an unlocked position wherein said pin is received within said open portion of said bore, said latch plate being beyond the end of said pin so that said pin is free to move out of said bore.

4. In the combination as claimed in claim 3, the further improvement wherein said pin includes a colored portion, said colored portion being received within said bore when said locking means is in the locked position.

5. In the combination as claimed in claim 3, the improvement wherein said body defines a slot receiving said ring therethrough, said ring being slidable within said slot for allowing said body to be moved between said locked position and said unlocked position.

6. In the combination as claimed in claim 5, said locking means further including a detent for inhibiting motion of said body between said locked and said unlocked positions.

7. In the combination as claimed in claim 6, said detent including a ball received in an opening in said body, and a spring urging said ball into said slot.

* * * * *